US009755553B2

(12) United States Patent
Zhou et al.

(10) Patent No.: US 9,755,553 B2
(45) Date of Patent: Sep. 5, 2017

(54) PAPER-BASE FLEXIBLE POWER-GENERATION APPARATUS, AND MANUFACTURING METHOD THEREOF

(71) Applicant: HUAZHONG UNIVERSITY OF SCIENCE AND TECHNOLOGY, Wuhan, Hubei (CN)

(72) Inventors: Jun Zhou, Wuhan (CN); Qize Zhong, Wuhan (CN); Junwen Zhong, Wuhan (CN); Bin Hu, Wuhan (CN); Qiyi Hu, Wuhan (CN)

(73) Assignee: Huazhong University of Science and Technology, Hubei (CN)

( * ) Notice: Subject to any disclaimer, the term of this patent is extended or adjusted under 35 U.S.C. 154(b) by 496 days.

(21) Appl. No.: 14/387,812

(22) PCT Filed: Dec. 3, 2013

(86) PCT No.: PCT/CN2013/088372
§ 371 (c)(1),
(2) Date: Sep. 24, 2014

(87) PCT Pub. No.: WO2014/090099
PCT Pub. Date: Jun. 19, 2014

(65) Prior Publication Data
US 2015/0048715 A1 Feb. 19, 2015

(30) Foreign Application Priority Data
Dec. 15, 2012 (CN) .......................... 2012 1 0548895

(51) Int. Cl.
H02N 1/08 (2006.01)
H02N 1/00 (2006.01)
(52) U.S. Cl.
CPC .............. H02N 1/08 (2013.01); H02N 1/006 (2013.01); Y10T 29/49009 (2015.01)

(58) Field of Classification Search
CPC ............................................... H02N 1/00–1/12
(Continued)

(56) References Cited

U.S. PATENT DOCUMENTS

2006/0076648 A1* 4/2006 Gally ..................... B81B 3/007
257/619
2008/0122313 A1* 5/2008 Mabuchi ................. H02N 1/08
310/309

(Continued)

FOREIGN PATENT DOCUMENTS

CN 102246407 A 11/2011
CN 102684546 A 9/2012
(Continued)

OTHER PUBLICATIONS

International Search Report and Written Opinion for PCT Application No. PCT/CN2013/088372; mailed Feb. 27, 2014, 9 pages.

Primary Examiner — Thomas Truong
(74) Attorney, Agent, or Firm — Lewis Roca Rothgerber Christie LLP

(57) ABSTRACT

A paper-base flexible power-generation apparatus, and a manufacturing method thereof. The flexible power-generation apparatus comprises: a first assembly (1) formed by a paper-base insulation layer (11) and a first metal conductive layer (12) deposited on the surface of the paper-base insulation layer, and a second assembly (2) formed by a paper-base insulation layer (21), a second metal conductive layer (22) deposited on the surface of the paper-base insulation layer, and an electret material layer (23) coating on the surface of the second metal conductive layer. The two edges of the two assemblies are each provided with an electrode (13, 24) and the electrodes are connected through a packaging process. The first metal conductive layer is opposite to and spaced from the electret material layer. The flexible power-generation apparatus has a low cost, is easy to (Continued)

manufacture, has high output power, and is especially suitable for being integrated with other flexible electronic devices.

9 Claims, 3 Drawing Sheets

(58) Field of Classification Search
USPC .............. 310/300, 309, 310; 600/459, 437; 73/718, 514.32; 381/174, 181; 29/886
See application file for complete search history.

(56) References Cited

U.S. PATENT DOCUMENTS

| | | | |
|---|---|---|---|
| 2010/0127595 A1* | 5/2010 | Suzuki | C09D 7/001 310/300 |
| 2010/0213789 A1 | 8/2010 | Igarashi | |
| 2012/0074812 A1* | 3/2012 | Fujimoto | H02N 2/188 310/323.01 |
| 2012/0169179 A1* | 7/2012 | Masaki | H02N 1/08 310/300 |

FOREIGN PATENT DOCUMENTS

| | | |
|---|---|---|
| CN | 103051244 A | 4/2013 |
| JP | 2010-198991 | 9/2010 |
| KR | 10-2012-0092466 A | 8/2012 |
| WO | WO 2014/090099 A1 | 6/2014 |

* cited by examiner

PAPER-BASE FLEXIBLE POWER-GENERATION APPARATUS, AND MANUFACTURING METHOD THEREOF

CROSS-REFERENCE TO RELATED APPLICATION

This is a National Phase Patent Application and claims priority to and the benefit of International Application Number PCT/CN2013/088372, filed on Dec. 3, 2013 in the State Intellectual Property Office of the P.R.C (SIPO), which claims priority to and the benefit of Chinese Patent Application No. CN 201210548895.3, filed on Dec. 15, 2012 in the SIPO, the entire contents of which are incorporated herein by reference.

FIELD OF THE INVENTION

The invention relates to the technique field of power generation by converting mechanical power into electrical energy, and more particularly to a paper-based flexible power generation apparatus and method for producing the same. The apparatus features flexible substrates, high output power, low cost, easy production and wide use.

BACKGROUND OF THE INVENTION

Energy is an indispensible source for human beings, and how to effectively gain energy in nature is always human beings' pursuit. Recently, with continued deterioration of energy crisis, to find a green energy supply becomes increasingly urgent. In fact, since the movement of people (such as walking) and other objects driven thereby may generate mechanical energy, the environments where people live, or even people themselves are an efficient power source, and collecting these neglected power sources is very prospective. Correspondingly, flexible power generation devices capable of efficiently transforming mechanical energy in the environment into electric energy have appeared.

Features of the flexible power generation device include: it is rollable, bendable, light and thin so that it can be attached to a moving object for effectively collecting energy. More importantly, it can be integrated with a novel flexible electronic device for supplying power thereto. At present, some leading electronic enterprises such as Samsung has developed concept mobile phones with flexible displays, which indicates rapid progress in electronic products such as PCs and smart eBooks. Moreover, from the viewpoint of both energy issues and technology trend, it is necessary to develop a flexible power generation device capable of being integrated with existing flexible electronic devices and conveniently and effectively collecting energy in the environment.

Conventional flexible power generation devices are flexible power generators produced based on piezoelectric effect. These flexible power generators are normally based on piezoelectric effect of one-dimensional nano-materials such as zinc oxide, polyvinylidene fluoride, lead zirconate titanate, and so on. However, there are many problems with this kind of power generator in application: firstly, complex production thereof includes precise processing of materials and accurate packaging of elements, which result in extremely high cost and make it impossible for mass production and application; secondly, normally output power thereof is comparatively low, and an LED can only be lighted up by charging a small capacitor for several hours; thirdly, a substrate thereof is made of high molecular weight plastic that is environmentally unfriendly and expensive.

SUMMARY OF THE INVENTION

In view of the above-mentioned problems, it is an objective of the invention to provide a paper-based flexible power generation apparatus and a method for producing the same that feature low cost, easy production and high output power, and is especially applicable to a flexible power generation apparatus integrated with other flexible electronic devices by improving materials of substrate, materials and operation principle of working elements, and structure and production process of the device.

In accordance with an exemplary embodiment of the invention, provided is a paper-based flexible power generation apparatus, including: a first assembly, including a paper-based insulation layer and a first metal conductive layer deposited on a surface of the paper-based insulation layer, a first electrode being formed on an edge of the first metal conductive layer; a second assembly, including a paper-based insulation layer, a second metal conductive layer deposited on a surface of the paper-based insulation layer, and an electret material layer coated on a surface of the second metal conductive layer, a second electrode being formed on an edge of the second metal conductive layer; an outer edge of the first assembly is connected to that of the second assembly via a packaging process, and the first metal conductive layer and the electret material layer are oppositely arranged with respect to each other, and a gap is disposed therebetween.

Based on above description, as the paper-based flexible power generation apparatus is pressed and released, the gap between the electret material layer and the first metal conductive layer varies, and the capacitance correspondingly varies. As a result, electrons oscillate in an external circuit connected to the electrode whereby forming an AC current. Especially, large amount of tests indicate that the paper-based flexible power generation apparatus is easily combined with other flexible materials for collecting mechanical energy. For example, as it is attached to a page of a book, the action of turning the page makes it possible to light up two blue LEDs or LCD displays, which proves the invention's potential in being integrated with other flexible electronic devices and supplying power thereto. Moreover, the substrate of the power generation device is paper-based so that it can be folded and bent, is easy for production, and features low cost and pollution, and good stability during power generation. Therefore, the device is particularly applicable for integration with other flexible electronic devices and daily lives.

According to an embodiment, the paper-based insulation layer is made of a kraft paper, a drawing paper, a stationary paper, or an art paper; the electret material layer is made of one of polytetrafluoroethylene, polyethylene, polypropylene, polyvinylidene fluoride, copolymer of polyethylene and polypropylene, polychlorotrifluoroethylene, copolymer of ethylene and tetrafluoroethylene, copolymer of vinylidene fluoride and trifluoroethylene, polyimide, polyethylene terephthalate, or a combination thereof.

By selecting the above-mentioned highly flexible paper material as the insulation layer, the device of the invention is rollable and bendable, features low cost, and can be integrated with other flexible electronic devices. Moreover, by utilizing appropriate electrets materials with good charge absorbing and preservation performance, the invention can generate high output power, features perfect wear resistance and bending durability, and is easy for production.

According to an embodiment, the first metal conductive layer and the second metal conductive layer are made of gold, silver, copper or aluminum.

Many testing experiments indicate that by limiting the first metal conductive layer and the second metal conductive layer to the above-mentioned materials, they can cooperate well with the paper-based insulation layer and the electret material layer, and feature comparatively high output power.

According to an embodiment, multiple micro and nano-scale concave and convex structures are disposed on a surface of the electret material layer opposite to the first metal conductive layer.

By processing and obtaining multiple micro and nano-scale concave and convex structures on the surface of the electret material layer, area of the surface is increased, and charge absorbing and preservation performance thereof is improved. Correspondingly, as the gap between the electret material layer having the micro and nano-scale concave and convex structures and the first metal conductive layer varies, the output power is higher.

In accordance with another exemplary embodiment of the invention, provided is a method for producing a paper-based flexible power generation apparatus, comprising acts of:

(a) preparing a first assembly: cutting a paper selected from a kraft paper, a drawing paper, a stationary paper, or an art paper into a sheet with a required size, forming a first metal conductive layer on a surface thereof via magnetron sputtering or thermal evaporation, processing an edge of the first metal conductive layer whereby forming a first electrode, and leading a conductive wire therefrom;

(b) preparing a second assembly: cutting a paper selected from a kraft paper, a drawing paper, a stationary paper, or an art paper into a sheet with a required size, forming a second metal conductive layer on a surface thereof via magnetron sputtering or thermal evaporation, the second metal conductive layer being disposed on an edge thereof and having a protection layer with a certain area, depositing a suspension made of electret materials on a remaining area of the surface via spin coating or spraying, removing the protection layer on the edge of the second metal conductive layer after drying and polarizing the electret materials, processing the edge whereby forming a second electrode, and leading a conductive wire therefrom;

(c) packaging the paper-based flexible power generation apparatus: connecting an outer edge of the first assembly prepared by act (a) to that of the second assembly prepared by act (b) via a packaging process, the first metal conductive layer and the electret material layer being oppositely arranged with respect to each other, and a gap being disposed therebetween.

According to an embodiment, in act (b), the electret material layer is made of one of polytetrafluoroethylene, polyethylene, polypropylene, polyvinylidene fluoride, copolymer of polyethylene and polypropylene, polychlorotrifluoroethylene, copolymer of ethylene and tetrafluoroethylene, copolymer of vinylidene fluoride and trifluoroethylene, polyimide, polyethylene terephthalate, or a combination thereof.

Advantages of the paper-based flexible power generation apparatus and method for producing the same over the prior art comprise:

1. by improving materials of a substrate of the paper-based power generation apparatus, and materials and operation principle of current elements thereof, higher output power can be obtained, and the invention can be directly utilized to drive various low-power electronic devices;

2. by selecting the highly flexible paper material as the insulation layer, the apparatus of the invention is rollable and bendable, features low cost and no pollution, and massive production thereof is easy; moreover, by utilizing appropriate electrets materials with good charge absorbing and preservation performance, the invention can generate high output power, features perfect wear resistance and bending durability, and is easy for production;

3. paper-based flexible power generation apparatus is made of flexible materials so that it can be folded and bent, and integrated with other flexible electronic devices, and therefore, the device is particularly applicable for integration with other flexible electronic devices and daily lives.

BRIEF DESCRIPTION OF ACCOMPANYING DRAWINGS

in which:

1—first assembly; 2—second assembly; 11—paper-based insulation layer; 12—first metal conductive layer; 13—first electrode; 21—paper-based insulation layer; 22—second metal conductive layer; 23—electret material layer; 24—second electrode.

SPECIFIC EMBODIMENTS OF THE INVENTION

For clear understanding of the objectives, features and advantages of the invention, detailed description of the invention will be given below in conjunction with accompanying drawings and specific embodiments. It should be noted that the embodiments are only meant to explain the invention, and not to limit the scope of the invention.

Figure 1:
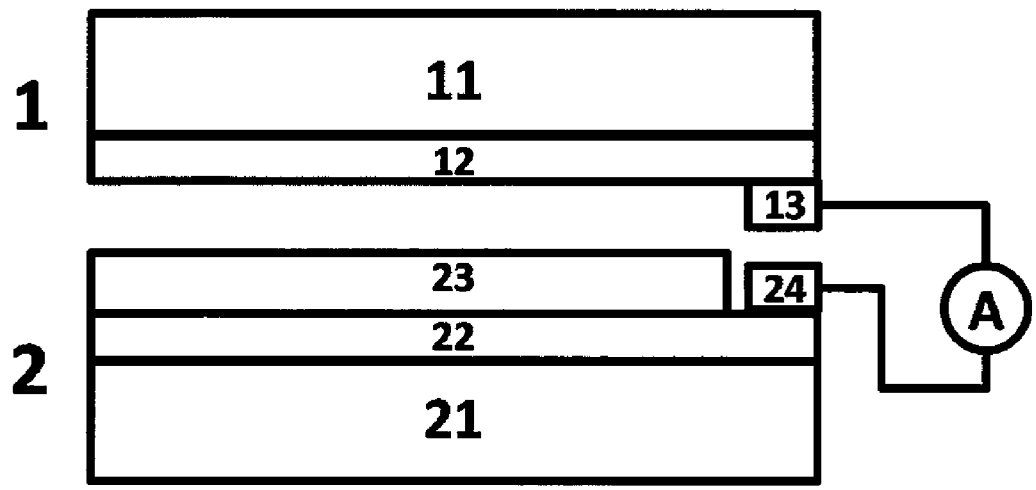
FIG. 1 is a schematic view of a paper-based flexible power generation apparatus of an example embodiment of the invention.

FIG. 1 is a schematic view of a paper-based flexible power generation apparatus of an example embodiment of the invention. As shown in FIG. 1, a paper-based flexible power generation apparatus of the invention includes a first assembly 1 and a second assembly 2. The first assembly 1 includes a paper-based insulation layer 11 (made of a highly flexible paper such as a kraft paper, a drawing paper, a stationary paper, or an art paper) and a first metal conductive layer 12 deposited on a surface (illustrated as lower surface) of the paper-based insulation layer 11, a first electrode 13 is formed on an edge of the first metal conductive layer 12, and may be connected to an external circuit via a conductive wire. Similarly, the second assembly 2 includes a paper-based insulation layer 21, a second metal conductive layer 22 deposited on a surface of the paper-based insulation layer 21, and an electret material layer 23 coated on a surface of the second metal conductive layer 22, and a second electrode 24 is formed on an edge of the second metal conductive layer 22, and can be connected to the first electrode 13 and an external circuit via a conductive wire. An outer edge of the first assembly 1 is connected to that of the second assembly 2 via a packaging process, the lower surface of the first metal conductive layer 12 and the upper surface of the electret material layer 23 are oppositely arranged with respect to each other, and an arc-shaped gap is disposed therebetween.

As the paper-based flexible power generation apparatus is utilized, the first electrode and the second electrode are connected via the conductive wires, and the first assembly and the second assembly are pressed so that the gap between the electret material layer and the first metal conductive layer varies. During the bending and the recovery processes, a capacitance correspondingly varies, which causes electrons to oscillate in the external circuit whereby forming an AC current. For example, large amount of tests have indicated that as the paper-based flexible power generation device is attached to a page of a book, mechanical energy generated by turning the page creates certain current forcing the power generation device to light up two blue LEDs or LCD displays, which proves the device can be integrated with other flexible electronic devices and supply power thereto. Moreover, the power generation apparatus is paper-based so that it can be folded and bent, is easy for production, and features low cost and no pollution, and good stability during power generation, and therefore, the device is particularly applicable for research on flexible electronics and daily lives.

Basic operation principle of the paper-based flexible power generation apparatus will be explained in details hereinafter.

As edge effects are not taken into account, the paper-based flexible power generation apparatus of the invention is equivalent to a parallel plate capacitor, which in balance is expressed as the following equation according to the Maxwell's equations:

$$U_{BE} = \frac{\sigma_2}{2\varepsilon_0}d_2 + \frac{\sigma_2}{2\varepsilon_{rp}\varepsilon_0}d_1 + \frac{\sigma}{2\varepsilon_{rp}\varepsilon_0}d_1 - \frac{\sigma}{2\varepsilon_0}d_2 - \frac{\sigma_1}{2\varepsilon_0\varepsilon_{rp}}d_1 - \frac{\sigma_1}{2\varepsilon_0}d_2 = U_{TE} = 0 \quad \text{(equation 1)}$$

Where $U_{BE}$ and $U_{TE}$ are respectively potential of the first metal conductive layer and the second metal conductive layer, $\sigma_1$, $\sigma_2$ and $\sigma$ and a are respectively surface charges density of the first metal conductive layer, the second metal conductive layer, and the electret material layer, $d_1$ and $d_2$ are respectively thickness of the electret material layer, and a distance of the gap, $\varepsilon_0$ is a vacuum dielectric constant, $\varepsilon_{rp}$ is a relative dielectric constant of the electret material layer.

A relationship is expressed as the following equation (2) based on the charge conservation principle:

$$-\sigma = \sigma_1 + \sigma_2 \quad \text{(equation 2)}$$

By substituting equation 1 with equation 2, the following equation (3) can be obtained:

$$\sigma_1 = -\frac{\sigma}{1+\frac{d_1}{d_2\varepsilon_{rp}}} \quad \text{(equation 3)}$$

$$Q = \sigma_1 S \quad \text{(equation 4)}$$

Where Q represents surface charge of the first metal conductive layer, and S represents an effective area of a part of the first metal conductive layer opposite to the second metal conductive layer.

In addition, current I is theoretically defined as:

$$I = \frac{\partial Q}{\partial t} \quad \text{(equation 5)}$$

Therefore, it can be deduced from equations 4 and 5 that current I is expressed as:

$$I = -\frac{\sigma S d_1 \varepsilon_{rp}}{(d_2\varepsilon_{rp} + d_1)^2} \frac{\partial d_2}{\partial t} \quad \text{(equation 6)}$$

It can be seen from the above equations and deduction that as an air gap between the first assembly and the second assembly varies, electrons may oscillate in an external circuit connected to both electrodes and thus forming an AC current. Correspondingly, the invention improves functional components and structures of conventional paper-based flexible power generation apparatus based on the above-mentioned principle whereby forming a stable and reliable flexible power generation apparatus with higher output power.

In a preferred embodiment, each of the paper-based insulation layers 21 and 22 is made of a highly flexible paper such as a kraft paper, a drawing paper, a stationary paper, an art paper, or so on. The electret material layer 23 is made of one of polytetrafluoroethylene, polyethylene, polypropylene, polyvinylidene fluoride, copolymer of polyethylene and polypropylene, polychlorotrifluoroethylene, copolymer of ethylene and tetrafluoroethylene, copolymer of vinylidene fluoride and trifluoroethylene, polyimide, polyethylene terephthalate, or a combination thereof.

The first metal conductive layer 12 and the second metal conductive layer 22 are made of one of gold, silver, copper, aluminum, and so on.

In another preferred embodiment, to improve an overall surface area and charges reservation capability of the electret material layer, multiple micro and nano-scale concave and convex structures (each having an average size of tens of nanometers to a few micrometers) are disposed on upper surface of the electret material layer opposite to the first metal conductive layer. Tests indicate the configuration enables the paper-based flexible power generation apparatus to have higher output power, and to meet requirements in most applications.

A method for producing a paper-based flexible power generation apparatus includes:

(1) cutting a high-flexibility paper selected from a kraft paper, a drawing paper, a stationary paper, or an art paper into a sheet with a required size, forming a first metal conductive layer on a surface thereof via magnetron sputtering or thermal evaporation, processing an edge of the first metal conductive layer whereby forming a first electrode, and leading a conductive wire therefrom;

(2) cutting a paper selected from a kraft paper, a drawing paper, a stationary paper, or an art paper into a sheet with a required size (alternatively, directly using the sheet obtained in above act (1)), forming a second metal conductive layer on a surface thereof via magnetron sputtering or thermal evaporation, the second metal conductive layer being disposed on an edge thereof and having a protection layer with a certain area, depositing a suspension made of electret materials on the remaining area of the surface via spin coating or spraying, removing the protection layer on the edge of the second metal conductive layer after drying and polarizing the electret materials, processing the edge whereby forming a second electrode, and leading a conductive wire therefrom; in this embodiment, the electret material layer is made of one of polytetrafluoroethylene, polyethylene, polypropylene, polyvinylidene fluoride, copolymer of polyethylene and polypropylene, polychlorotrifluoroethylene, copolymer of ethylene and tetrafluoroethylene, copolymer of vinylidene fluoride and trifluoroethylene, polyimide, polyethylene terephthalate, or a combination thereof;

(3) packaging the paper-based flexible power generation device: connecting an outer edge of the first assembly to that of the second assembly via a packaging process, the first metal conductive layer and the electret material layer being oppositely arranged with respect to each other, and a gap being disposed therebetween.

After the paper-based flexible power generation apparatus is produced, several performance tests are performed thereon.

Figure 2A:
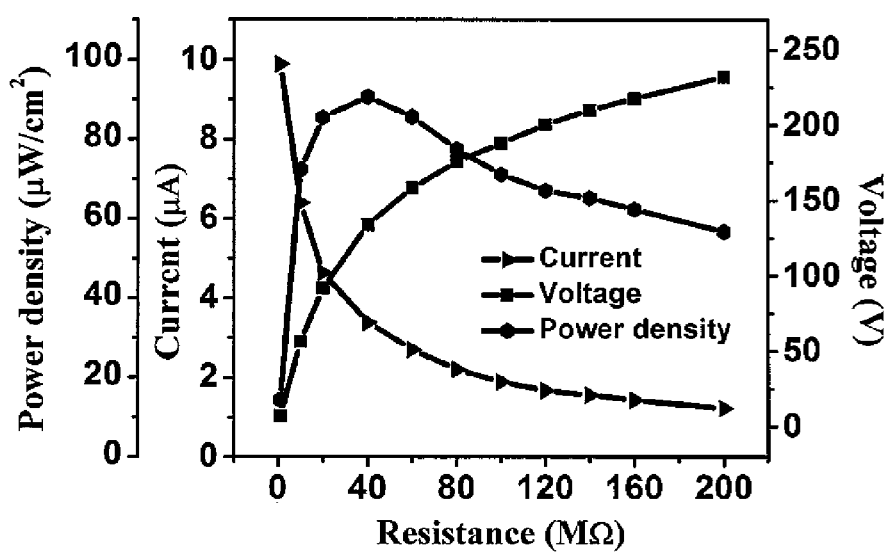
FIG. 2a is a curve illustrating variation of current, voltage and power of the paper-based flexible power generation apparatus with a load resistance under a frequency of 40 Hz and an oscillator's advance distance of 1.5 mm.

FIG. 2a is a curve illustrating variation of current, voltage and power of the paper-based flexible power generation apparatus with a load resistance under a frequency of 40 Hz and an oscillator's advance distance of 1.5 mm. As shown in FIG. 2a, as an external load resistance increases, current flowing through the load decreases, and voltage across the load increases. As the external load resistance is 40 MΩ, a peak output power of the load of the paper-based flexible power generation apparatus reaches a peak value of 90.6 µW/cm².

Figure 2B:
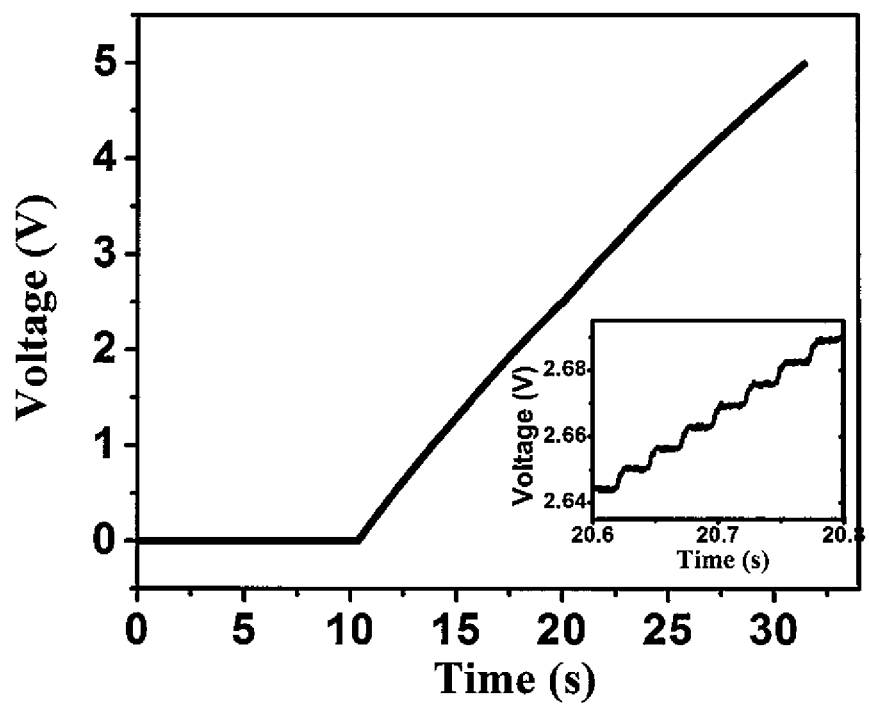
FIG. 2b is a curve of charging a capacitor of 4.7 μF by the paper-based flexible power generation apparatus under a frequency of 40 Hz and an oscillator's advance distance of 1.5 mm.

FIG. 2b is a curve of charging a capacitor of 4.7 µF by the paper-based flexible power generation apparatus under a frequency of 40 Hz and an oscillator's advance distance of 1.5 mm. It can be seen from the curve that voltage across the capacitor can be increased to 5V in only 20 seconds, which indicates that the paper-based flexible power generation apparatus can supply power to electronic devices as well as charging energy storage devices.

Figure 3:
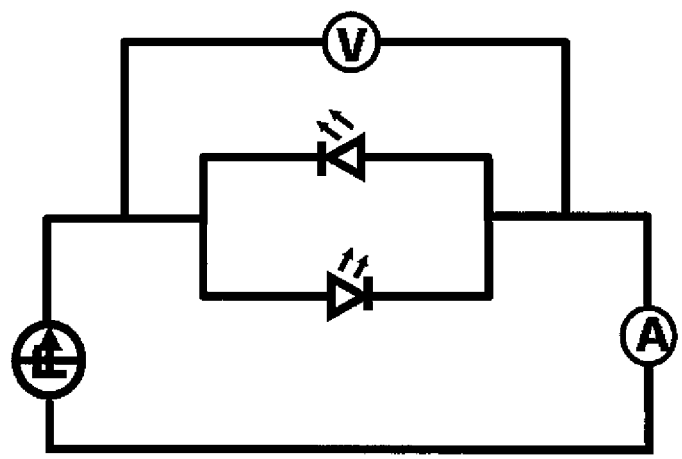
FIG. 3 is a schematic diagram of lighting up a LED by attaching the paper-based flexible power generation apparatus to a page of a book and collecting mechanical energy generated by turning the page.

FIG. 3 is a schematic diagram of lighting up a LED by attaching the paper-based flexible power generation apparatus to a page of a book and collecting mechanical energy generated by turning the page. Two blue LEDs are reversely parallel connected, a positive electric signal generated upon turning the page lights up one LED, and a negative electric signal generated in a recovery process lights up the other LED.

Figure 4A:
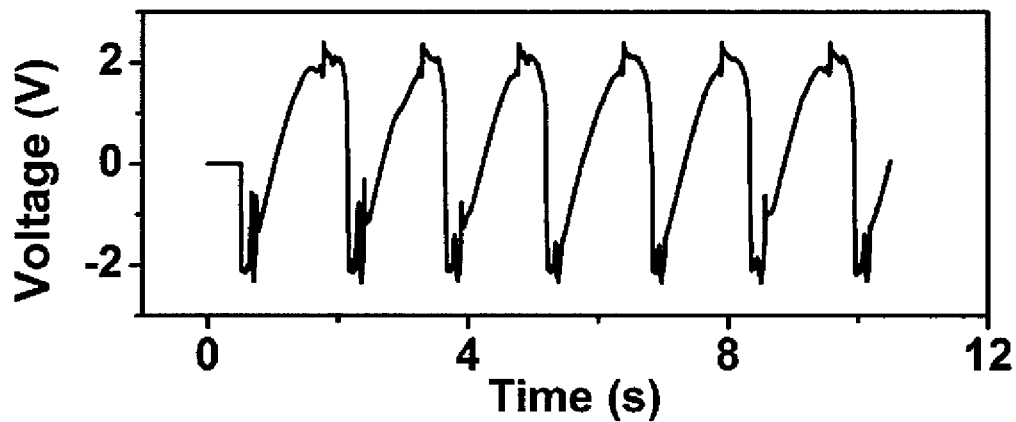
FIGS. 4a and 4b are respectively a curve illustrating variation of voltage and current flowing through the LED in FIG. 3 with time.
Figure 4B:
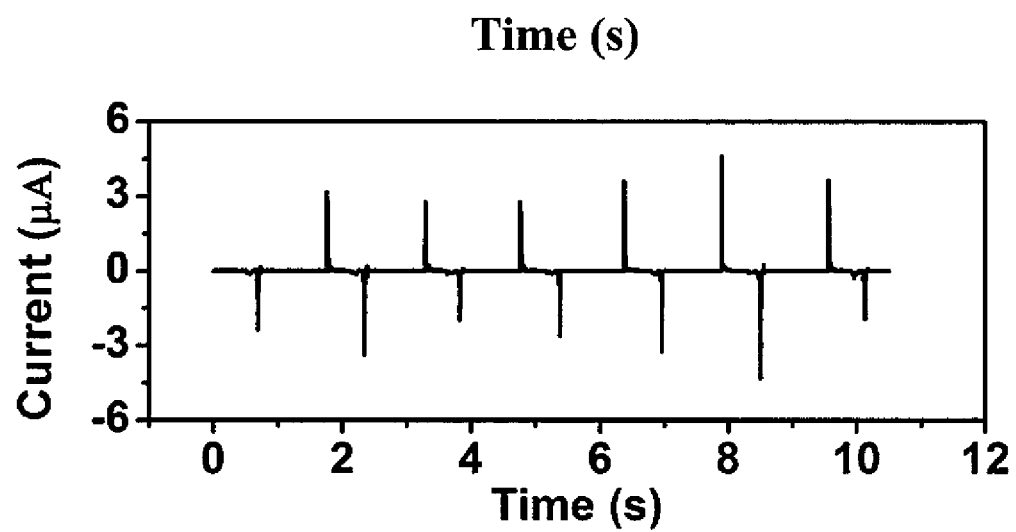

FIGS. 4a and 4b are respectively a curve illustrating variation of voltage and current flowing through the LED in FIG. 3a with time as the paper-based flexible power generation apparatus is attached to a page of a book and a turning and recovery action is performed repeatedly on the page to light up the LED. Gate voltage of the two blue LEDs is approximately 2.5 V, and it is required that current flowing through one LED as being lighted up is above 3 µA.

To summarize, the paper-based flexible power generation apparatus of the invention operates based on electrification generated by electret, frictional electrification, and capacitance variance, and features low cost, simple structure, and easy usage and mass production. Compared with conventional micro energy collection methods, the paper-based flexible power generation apparatus of the invention has higher output power, flexible materials thereof enable the device to be rollable and bendable, and the device also features easy production, perfect stability during power generation, and long working life. More importantly, the device can be integrated with other flexible electronic devices, or even arranged at users' joints or on other normal driving tools whereby supplying power thereto by transforming mechanical power into electric energy. The paper-based flexible power generation apparatus has proven its good application prospect, as well as great application potential in sensitive components, such as pressure sensors and so on.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A paper-based flexible power generation apparatus, comprising:
 a first assembly, comprising a paper-based insulation layer and a first metal conductive layer deposited on a surface of said paper-based insulation layer, a first electrode being formed on an edge of said first metal conductive layer; and
 a second assembly, comprising a paper-based insulation layer, a second metal conductive layer deposited on a surface of said paper-based insulation layer, and an electret material layer coated on a surface of said second metal conductive layer, a second electrode being formed on an edge of said second metal conductive layer;
 wherein
 an outer edge of said first assembly is connected to that of said second assembly via a packaging process, and
 said first metal conductive layer and said electret material layer are oppositely arranged with respect to each other, and a gap is disposed therebetween.

2. The paper-based flexible power generation apparatus of claim 1, wherein
 said paper-based insulation layer is made of a kraft paper, a drawing paper, a stationary paper, or an art paper;
 said electret material layer is made of one of polytetrafluoroethylene, polyethylene, polypropylene, polyvinylidene fluoride, copolymer of polyethylene and polypropylene, polychlorotrifluoroethylene, copolymer of ethylene and tetrafluoroethylene, copolymer of vinylidene fluoride and trifluoroethylene, polyimide, polyethylene terephthalate, or a combination thereof.

3. The paper-based flexible power generation apparatus of claim 2, wherein said first metal conductive layer and said second metal conductive layer are made of gold, silver, copper or aluminum.

4. The paper-based flexible power generation apparatus of claim 2, wherein multiple micro and nano-scale concave and convex structures are disposed on a surface of said electret material layer opposite to said first metal conductive layer.

5. The paper-based flexible power generation apparatus of claim 1, wherein said first metal conductive layer and said second metal conductive layer are made of gold, silver, copper or aluminum.

6. The paper-based flexible power generation apparatus of claim 5, wherein multiple micro and nano-scale concave and convex structures are disposed on a surface of said electret material layer opposite to said first metal conductive layer.

7. The paper-based flexible power generation apparatus of claim 1, wherein multiple micro and nano-scale concave and convex structures are disposed on a surface of said electret material layer opposite to said first metal conductive layer.

8. A method for producing a paper-based flexible power generation apparatus, comprising acts of:

(a) preparing a first assembly: cutting a paper selected from a kraft paper, a drawing paper, a stationary paper, or an art paper into a sheet with a required size, forming a first metal conductive layer on a surface thereof via magnetron sputtering or thermal evaporation, processing an edge of said first metal conductive layer whereby forming a first electrode, and leading a conductive wire therefrom;

(b) preparing a second assembly: cutting a paper selected from a kraft paper, a drawing paper, a stationary paper, or an art paper into a sheet with a required size, forming a second metal conductive layer on a surface thereof via magnetron sputtering or thermal evaporation, said second metal conductive layer being disposed on an edge thereof and having a protection layer with a certain area, depositing a suspension made of electret materials on a remaining area of said surface via spin coating or spraying, removing said protection layer on said edge of said second metal conductive layer after drying and polarizing said electret materials, processing said edge whereby forming a second electrode, and leading a conductive wire therefrom;

(c) packaging said paper-based flexible power generation apparatus: connecting an outer edge of said first assembly prepared by act (a) to that of said second assembly prepared by act (b) via a packaging process, said first metal conductive layer and said electret material layer being oppositely arranged with respect to each other, and a gap being disposed therebetween.

9. The method of claim 8, wherein in act (b), said electret material layer is made of one of polytetrafluoroethylene, polyethylene, polypropylene, polyvinylidene fluoride, copolymer of polyethylene and polypropylene, polychlorotrifluoroethylene, copolymer of ethylene and tetrafluoroethylene, copolymer of vinylidene fluoride and trifluoroethylene, polyimide, polyethylene terephthalate, or a combination thereof.

* * * * *